(No Model.) 2 Sheets—Sheet 1.

D. W. RUSSELL & G. SHILLING.
PANTOGRAPH.

No. 548,327. Patented Oct. 22, 1895.

Witnesses:
J. B. McGivr.
Raymond H. Dyer.

Inventors:
David W. Russell
George Shilling
by Frank L. Dyer
Attorney (No Model.) 2 Sheets—Sheet 2.
D. W. RUSSELL & G. SHILLING.
PANTOGRAPH.
No. 548,327. Patented Oct. 22, 1895.
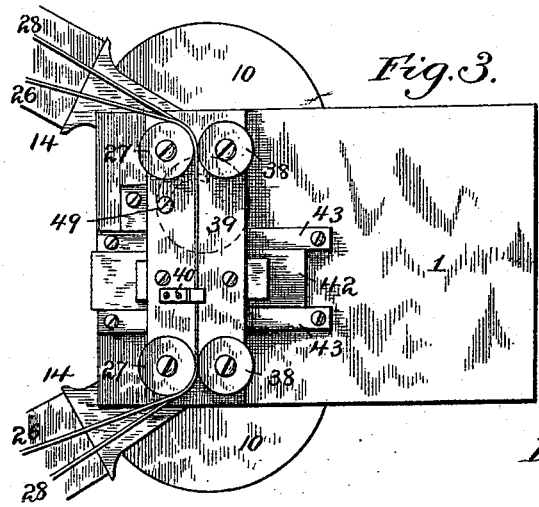
Fig. 3.
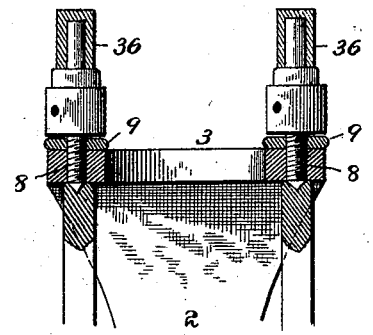
Fig. 4.
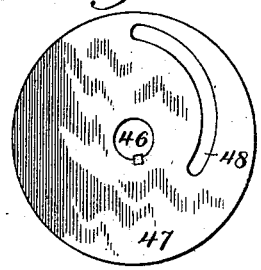
Fig. 5.
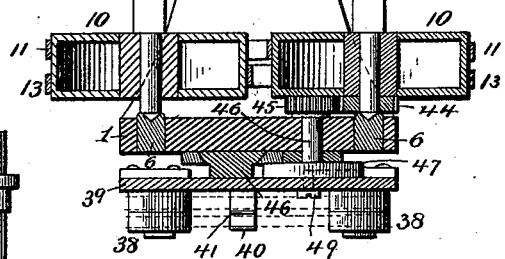
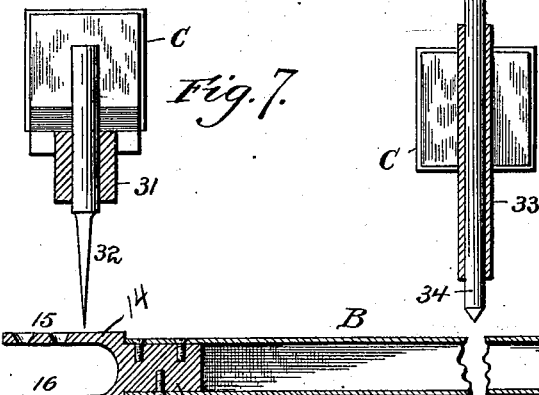
Fig. 7. Fig. 8.
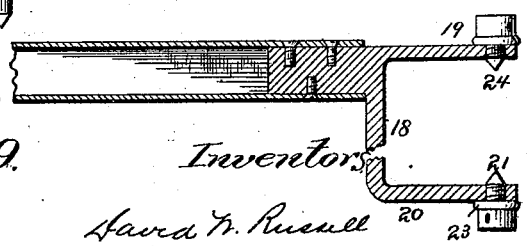
Fig. 9.
Witnesses:
J. B. M. Giver
Armand H. Dyer
Inventors
David W. Russell
George Shilling
by Frank L. Dyer Attorney

UNITED STATES PATENT OFFICE.

DAVID W. RUSSELL AND GEORGE SHILLING, OF WASHINGTON, DISTRICT OF COLUMBIA; SAID RUSSELL ASSIGNOR, BY DIRECT AND MESNE ASSIGNMENTS, TO FRANK L. DYER, OF SAME PLACE.

PANTOGRAPH.

SPECIFICATION forming part of Letters Patent No. 548,327, dated October 22, 1895.

Application filed December 3, 1892. Renewed March 18, 1895. Serial No. 542,272. (No model.)

*To all whom it may concern:*

Be it known that we, DAVID W. RUSSELL and GEORGE SHILLING, citizens of the United States, residing at Washington, in the District of Columbia, have invented certain new and useful Improvements in Pantographs; and we do hereby declare the following to be a full, clear, and exact description of the invention, which will enable others skilled in the art to which it appertains to make and use the same.

Our present invention relates to various new and useful improvements in pantographs.

The principal objects of the invention are to provide a pantograph in which there will be but few moving parts, whereby the construction thereof will be materially simplified and cheapened, and to make use in such a pantograph of steel tapes for transmitting the various movements thereof, whereby there can be no lost motion within the same.

The particular pantograph which we have designed and which we shall describe herein is especially adapted for use in engraving in negative on copper plates, maps, sketches, portraits, pictures, and other positive originals; but it will be understood that the invention is capable of being put into use in all connections and under all conditions that pantographs are now employed in and operate under.

For a better comprehension of our invention attention is directed to the accompanying drawings, forming a part of this specification, and in which—

Figure 1:
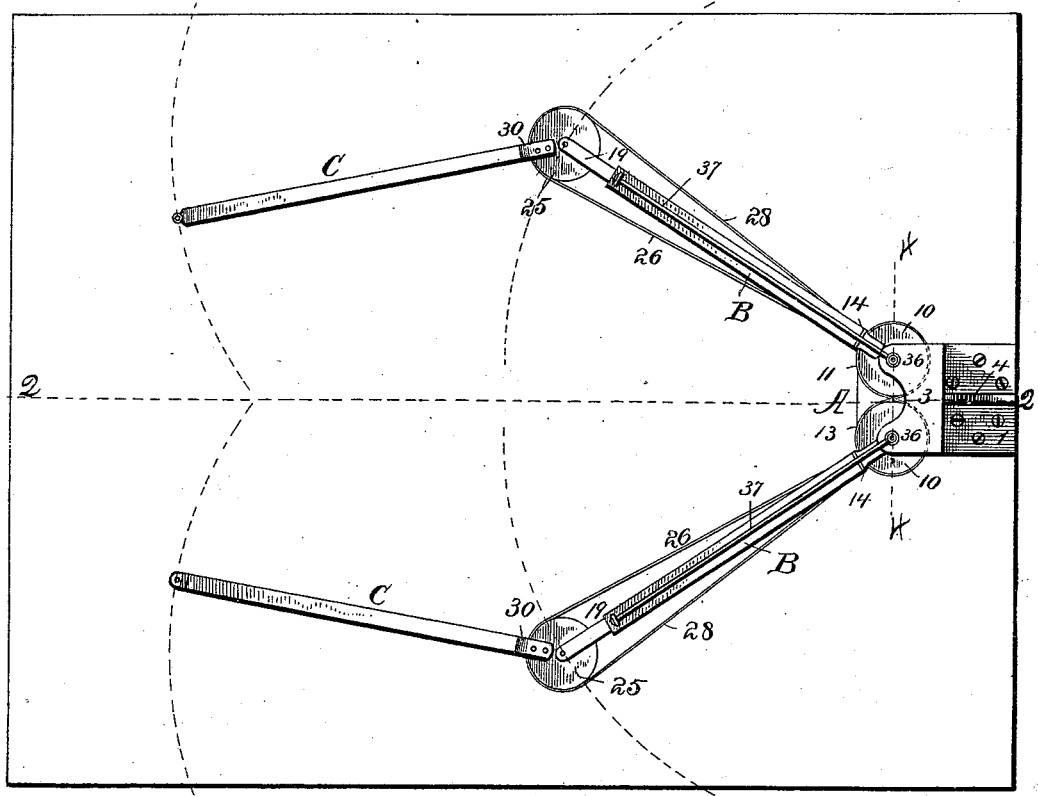
Figure 2:
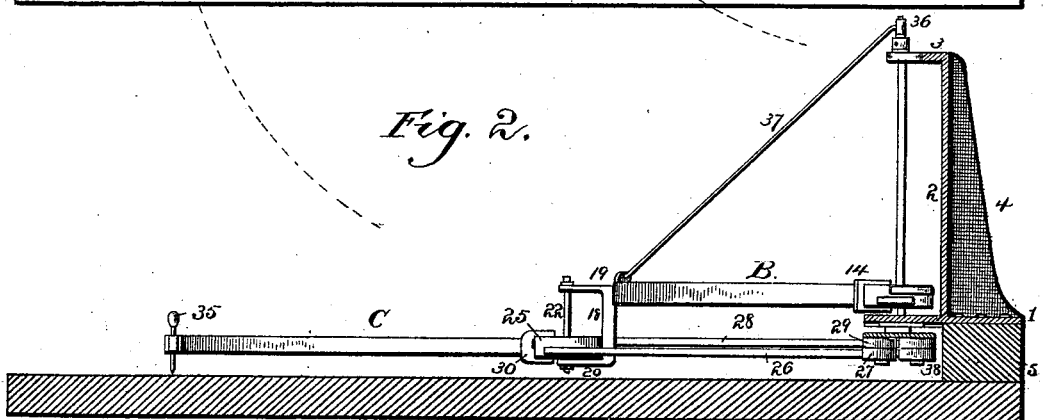
Figure 6:
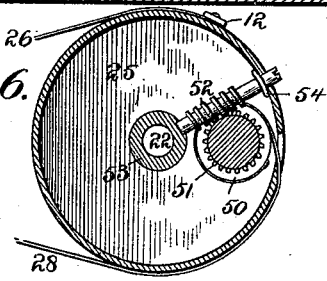

Figure 1 is a plan view of the entire device. Fig. 2 is a sectional view taken through the line 2 2 of Fig. 1. Fig. 3 is a bottom plan view of the base. Fig. 4 is a vertical sectional view taken through the line 4 4 of Fig. 1. Fig. 5 is a detail view of the cam within the base. Fig. 6 is a sectional plan of one of the arms, illustrating the mechanism for adjusting the tapes therein. Fig. 7 is a side view of the tracing-tool. Fig. 8 is a similar view of the engraving-tool; and Fig. 9, a section through one of the primary arms, more particularly for illustrating the mode of attachment thereof to the drum.

In all of the above views corresponding parts are designated by the same letters and characters of reference.

A is the base of the machine, which is preferably made of cast metal—such as iron, aluminium, or brass—and consisting of a flat horizontal portion 1, the vertical portion 2, extending up from about the central part thereof, and the overhanging portion 3 at the top of the vertical portion 2. The vertical portion 2 is to be strengthened by a rib or web 4 at the back thereof. The said base A is to be screwed or bolted to a block or support 5 on the table, so as to be elevated a short distance above the latter, whereby the various operating-arms will be allowed to swing freely in any desired direction.

On the horizontal portion of the base A are the steel bearing-cones 6 6, and mounted on each is a vertical supporting-shaft 7. The upper end of each supporting-shaft 7 is recessed for the admission of the bearings 8, which are screw-threaded, as shown, and engage with and pass through the overhanging portion 3 of the base. The upper portions of said bearings 8 are constructed so as to be readily turned and take up any wear of the supporting-shafts 7, either by making the same square or hexagonal, to be turned by an ordinary wrench, or by making the same cylindrical and providing the same with openings therein, in which a suitable steel tool may be inserted and by which the said bearings 8 may be turned. On each of the said bearings 8 is a jam-nut 9, which may be tightened to engage with the overhanging portion 3 of the base A, whereby the bearings 8 may be locked in any desired position in the well-known way. Mounted on and keyed to each of said supporting-shafts 7, near the lower part thereof, is a hollow drum 10, made of metal in any well-known way, the two drums being arranged in the same horizontal plane and side by side. The said drums are preferably cylindrical in shape, but they may be made rectangular, hexagonal, octagonal, or of any other shape without seriously affecting the correct operation of the device.

11 is a steel tape of any desired width and sufficiently thin to be flexible anchored to one of the drums (the left-hand drum being shown) at one end by the plate 12, which is screwed to the periphery of the said drum. The screws for holding the said plate 12 in place may or may not pass through the tape. The said tape is passed partly around the said drum and thence to the periphery of the other drum, (the right-hand drum,) entering the latter and passing around the adjusting-bobbin within the same, which will be more fully described hereinafter. 13 is another and similar tape, which is anchored to the periphery of the right-hand drum in the same way and passing directly to the other drum over or under the tape 11 entering the other said drum, adjusted in the same manner as the tape 11.

The two tapes 11 and 13, which connect the two drums, cross each other in the space between the drums and oppose each other, so that when one of the said drums is partially rotated the other drum will partake of precisely the same extent; but reversal of movement, one of said steel tapes operating to bring about that movement and the other operating to hold the two drums in the same position relative to each other. When the said drum is moved in the opposite direction, the idle tape becomes an active tape, and vice versa.

Instead of tapes, wires or chains or analogous devices may be substituted.

B B are the primary arms, which are of the same length. These arms are preferably made of hollow tubing, rectangular or cylindrical, to obtain lightness with rigidity. The connection of one of these primary arms B to one of the drums is clearly illustrated in Fig. 9.

14 is a metal casting having two flat parallel arms 15 and 16, which are screwed or otherwise fastened to the top and bottom of one of the drums 10 and provided with an extension 17, which fits snugly within one end of the primary arms B, being held therein in any desired way, either by soldering, rivets, pins, or set-screws, as shown. At the other end of each of the primary arms B and held in place therein in exactly the same way is another casting 18, provided with a horizontal arm 19, extending approximately level with the top of the primary arm B and with a downwardly-extending right-angled arm 20, its horizontal portion being hollow and parallel with the arm 19. Mounted within the horizontal portion of said right-angled arm of each of the castings 18 on the end of the primary arm B is a cone bearing-point 21, having screw adjustment, as shown, and engaging with each of said bearing-points, which are to be made of hardened steel, is a supporting-shaft 22, recessed in its upper end the same way as in its lower end. The bearing-points 21 are provided with jam-nuts 23, which are to be tightened up against the lower side of the horizontal portion of each right-angled arm 20 and by means of which the said bearing-points may be securely locked at any desired point. 24 is a bearing-point which passes through and engages with each of the said horizontal arms 19 of each casting, and the lower or coned end of each of said bearings 24 engages with the recessed upper end of the supporting-shafts 22, whereby the latter will be securely held by and between the bearings 21 and 24. The said bearing-points 24 are also provided with jam-nuts 23 for securely locking the same in any desired position. Any wear may be taken up by turning and tightening said bearings 21 or 24 in any suitable way, such as providing the same with enlarged cylindrical heads having openings therein for the insertion of a proper tool, as we have shown in Fig. 9, or by making the same square or hexagonal for the application of an ordinary wrench. Mounted on each of said supporting-shafts 22 is a hollow drum 25, constructed in precisely the same way as the before-mentioned drums 10. The drums 25 are preferably keyed to the shafts 22, so as to rotate with the same.

26 is a steel tape corresponding to the tapes 11 and 12, which is anchored to the periphery of one of the drums 25 and extends back to the base A of the machine, passing around rollers 27 27, mounted as we shall herein describe, and thence extending to the corresponding periphery of the other drum—that is to say, this tape 26 extends from the outside periphery of one drum with respect to a line drawn centrally through the machine to the inside periphery of the other drum with respect to the same line. The tape 26 is anchored at one end to one drum and enters the other drum and is adjusted by means of an adjusting-bobbin in precisely the same way as the tapes 11 and 13.

28 is another steel tape, which is anchored to the inside periphery of one drum with respect to a line drawn centrally through the machine and extends back to the base A of the machine, passing around rollers 29 29, which are mounted either above or below the rollers 27 27 on the same shafts therewith, and thence extending to the outside periphery of the other drum with respect to the same line. This tape 28 is connected in precisely the same way as the tape 26—that is to say, it is anchored to the periphery of one drum and passes around the adjusting-bobbin on the inside of the other drum. For convenience an adjusting-bobbin is placed in each drum, so that one tape 26 is anchored to one drum, and the other tape 28 is adjusted to the same drum.

Secured to each drum 25 is a ring 30, which is made in substantially the same manner as the casting 14 before referred to, and secured to each of said castings in the same manner as the primary arms B are secured to the castings 14 is a secondary arm C, which is made of metal tubing, either rectangular or cylindrical, for the sake of lightness and rigidity. The free ends of the secondary arms C carry the operating-tools. In the drawings, Fig. 7, we have shown one operating-arm C, provided at its end with a hollow sleeve 31 for carrying a pointed tracing-tool 32, constructed as shown. At the free end of the other secondary arm C is a longer sleeve 33 for carrying the engraving-tool 34. This engraving-tool carries a weight 35 at its upper end, made of proper size to give the desired pressure of the engraving-tool upon the gelatine coating of the engraving-plate. The tracing-tool 32 can be elevated or depressed within the sleeve 31 to accommodate itself to any thickness of the work which may be placed beneath it, or to allow it to be elevated entirely away from the work, and the engraving-tool 34 is also capable of this movement within the sleeve 33.

In the description which I have given herein the indispensable parts of the machine have been covered and its principle can be easily understood from our description of these indispensable parts.

Let us suppose that the tracing-tool is moved toward a line drawn centrally through the machine. This movement will tend partially to rotate the drum to which the secondary arm carrying the tracing-wheel is attached, and said drum will be partially rotated. This movement will be transmitted by means of the tape 26 to the inside periphery of the other drum, which will be rotated in an opposite direction, but with the same extent of movement. The movement of this latter drum will give the secondary arm C, which carries the engraving-tool, a movement toward the same central line and with the same extent of movement as the other secondary arm, so that the engraving-tool will be advanced toward the said central line with the same extent of movement as the tracing-tool, whereby the movement of the tracing-tool will be reproduced exactly by the engraving-tool in an opposite direction. Any movement, therefore, which the said secondary arms may make without affecting the primary arms will be transmitted in the machine entirely by the tapes 26 and 28, the former tape being an active tape when the tracing-tool approaches the central line of the machine, and the second tape 28 being an active tape when the tracing-tool is advanced away from said central line.

By the expression "active tape" used herein we mean that tape which exerts power to bring about a movement within the machine, the other tape being an idle tape which does not transmit motion, but which keeps the parts in the same relative position with each other, as will be understood. When the tracing-tool is advanced toward and away from the central line and at the same time is caused to approach or recede from the base, it will cause the primary arms to be operated, as we have before described, by means of the tapes 11 and 13, so that when an original map, sketch, picture, or other impression is being traced by the tracing-tool the engraving-tool will reproduce this movement in the negative. It will be understood that by connecting this tape 26 to the periphery of each drum farther away from the central line, and by connecting the tape 28 to the periphery of the drum nearest to said central line, or in such a way that the first-mentioned tape will extend from the periphery of the said drums farthest away from said central line, and that said tape 28 will extend from the periphery of the drum nearest the said central line, any movement of the tracing-wheel will be followed exactly in extent and direction of movement by the engraving-tool, whereby the original impression will be reproduced on the engraving plate or paper.

While the elements which have been before described may be called the indispensable elements of the device, still other elements are necessary to be included therein for the perfect operation of the machine, and these elements will now be described.

In the upper end of each bearing 8 is placed a removable cap, and connecting each of these caps to one of the said primary arms B is a stay-rod or wire 37 for more perfectly supporting the said primary arms, and it will be evident that the bearing 24 may be extended up and that the stay-rods may be extended therefrom down to the secondary arms C for supporting the latter.

We have mentioned above that the tape 26 passes around rollers 27 27 in the base of the machine and that the tape 28 passes around rollers 29 29 either above or below rollers 27 27 and mounted on the same shafts therewith, for which see Figs. 2 and 4. In said figures we have shown guide-rollers 38, corresponding to the rollers 27 27 and 29 29, which serve to keep the tapes 26 and 28 on said mentioned rollers. It will be evident that as the primary arms B are spread apart as far as possible the tapes 26 and 29 will extend out directly from between said rollers 29 29, 27 27, and guide-rollers 38; but that as soon as the said primary arms are approached toward each other the said tape 26 will partially encircle the rollers 27 27, and said tapes 28 will partially encircle the rollers 29 29, thereby tending to shorten the said tapes 26 and 28. It will therefore be necessary to provide some mechanism by which the said rollers 27 27, 29 29, and 38 may be moved slightly back and forth to allow for this shortening and lengthening of the tapes 26 and 28 when the primary arms B B are approached toward and recede from each other, and this mechanism is the more clearly shown in Figs. 5 and 6 of the drawings, to which attention is especially directed.

The rollers 27 27, 29 29, and 38 are mounted on a horizontal carrying-plate 39, and on this carrying-plate is a small guide-arm 40, carrying fingers 41, one of which extends over the lower tape 28 (the tape 28 being illustrated) to keep the same from dropping off the rollers 29, and the other of which extends below the other tape to keep it from dropping off the rollers 27 and to separate the two tapes.

The before-mentioned carrying plate 39 is rigidly secured to the slide 42, which works in and is retained by guides 43, which are attached to the bottom of the base A, whereby the said slide 42 is free to move lengthwise with the base. On one of the supporting-shafts 7, directly beneath the drum 10 thereon, is a spur-wheel 44, which engages with another spur-wheel 45, mounted on a shaft 46, which extends directly through the base of the machine. This shaft 46 carries at its lower end a face-wheel 47, which operates directly adjacent to the carrying-plate 39. This face-wheel is provided on its bottom face with a curved cam-groove 48, made of the proper curve to bring about the desired action of the parts.

By means of the mechanism which we have just described it will be evident that when one of the primary arms B is moved the other arm follows the same movement, the spur-wheel 44 will be partially rotated, and, engaging with the spur-wheel 45, will cause the face-wheel 47 to be also partially rotated. The movement of this face-wheel 47 will cause the cam-groove 48 to be moved, whereby the set-screw 49, which engages therewith, will be moved according to the inclination of the cam-groove, whereby the carrying-plate 39 will retract or advance the rollers 27 27, 29 29, and 38 in such a way that the tapes 26 and 28 will always retain the same amount of tension irrespective of any movement of the primary arms.

The only mechanism which need now be described in the device is the arrangement of the drums 10 and 25, whereby the various steel tapes 11, 13, 26, and 28 may be tightened and loosened, and in order that this mechanism may be better understood attention should be given to Fig. 6 of the drawings, wherein one of the drums is shown. The said drum, which is hollow, is provided therein with a metal bobbin 50, bearing on the upper and lower faces of said drum. This bobbin 50 is provided on its periphery with worm-teeth 51, and engaging with these teeth is a worm 52, extending through the periphery of the drum and bearing within the hub 53 of the drum. The said worm is provided with a collar 54, bearing against the inner wheel of the drum for holding the said worm in its place. This portion of the worm, which extends outside of the periphery of the drum, is so constructed that it may be turned either by making it rectangular or hexagonal, to be operated by an ordinary wrench or by making therein an ordinary screw-groove, by which it may be turned by a screwdriver. The tape which enters the drum passes around the periphery of the bobbin 50 and is attached thereto in any suitable way. It will be evident that by turning the worm 52, which will engage with the worm-teeth 51, the bobbin will be rotated, whereby the steel tape will be wound up thereon to be tightened or wound off thereof to be loosened.

Before claiming our invention it is to be understood that while especially adapted for use in engraving plates in negative it may still be put to any other use to which pantographs are now applied, and that by substituting a pencil or pen in place of the engraving-tool 34 the impression can be reproduced in negative upon paper or other recording surfaces, and it will be understood, as we have before mentioned, that by exchanging the places of the tapes 26 and 28 the machine can be used for reproducing originals instead of negatives.

Having now described our invention, what we claim as new therein, and desire to secure by Letters Patent, is as follows:

1. In a pantograph, the combination of a base, two primary arms, mounted upon and swinging from said base; a secondary arm, mounted upon and swinging from the free end of each primary arm; connections between said primary arms, whereby the latter will be moved simultaneously either to approach or recede from each other; and connections between said secondary arms, whereby the latter will be moved simultaneously either to approach or recede from each other, whereby the movement of one secondary will be reproduced in negative by the other secondary arm.

2. In a pantograph, the combination of a base, two primary arms mounted upon and swinging from said base; a drum attached to the mounted end of each primary arm; tapes connecting the periphery of one drum with the periphery of the other drum, said tapes forming connections between said primary arms, whereby said primary arms may be operated simultaneously; a secondary arm mounted upon and swinging from the free end of each primary arm; and connections between said secondary arms, whereby the latter may be operated simultaneously, substantially as described.

3. In a pantograph, the combination of a base, two primary arms mounted upon and swinging from said base; connections between said primary arms, whereby the latter will be operated simultaneously; a secondary arm mounted upon and swinging from the free end of each primary arm; a drum on the mounted end of each secondary arm; and tapes extending from the periphery of one drum through or adjacent to said base, to the periphery of the other drum, whereby said secondary arms may be operated simultaneously, substantially as described.

4. In a pantograph, the combination of a base, two primary arms pivoted upon and swinging from said base; a drum on the pivoted end of each primary arm; tapes connecting the periphery of one of the said drums to the periphery of the other of said drums, whereby the primary arms may be operated simultaneously; a secondary arm, pivoted to the free end of each primary arm; a drum on the pivoted end of each secondary arm; and tapes extending from the periphery of one of said last mentioned drums, through or adjacent to said base, to the periphery of the other of said last mentioned drums, whereby the secondary arms may be operated simultaneously, substantially as described.

5. In a pantograph, the combination of a base, two primary arms pivoted upon and swinging from said base, connections between said primary arms, whereby the latter may be operated simultaneously; a secondary arm pivoted upon and swinging from the free end of each primary arm, connections between said secondary arms, whereby the latter may be operated simultaneously; a tracing tool in the free end of one of said secondary arms, and a reproducing tool in the free end of the other of said secondary arms, substantially as described.

6. In a pantograph, the combination of a base, two primary arms pivoted upon and swinging from said base; connections between said primary arms, whereby the latter may be moved simultaneously; a secondary arm mounted upon and swinging from the free end of each primary arm; connections between said primary arms, whereby the latter may be operated simultaneously; a vertically movable tracing tool on the free end of one of said secondary arms; and a vertically movable engraving tool carrying a weight, on the free end of the other of the said secondary arms, substantially as described.

7. In a pantograph, the combination of a base, two primary arms pivoted upon and swinging from said base; a drum on the pivoted end of each primary arm; tapes connecting the periphery of one drum with the periphery of the other drum, and adjustable within said drums, whereby the primary arms may be operated simultaneously; a secondary arm pivoted upon and swinging from the free end of each primary arm; a drum mounted upon the pivoted end of each of said secondary arms; tapes extending from the periphery of each of said last mentioned drums to the periphery of the other of said last mentioned drums and adjustable in said last mentioned drums, whereby the secondary arms may be operated simultaneously; a tracing tool on the free end of one of said secondary arms and a reproducing tool in the free end of the other of said secondary arms, substantially as described.

8. In a pantograph, the combination of a base, rollers within said base; two primary arms pivoted upon and swinging from said base; connections between said primary arms, whereby the latter may be operated simultaneously; a secondary arm pivoted to the free end of each of said primary arms; a drum on the pivoted end of each secondary arm; tapes extending from the periphery of one of said drums to the periphery of the other of said drums, whereby the secondary arms may be operated simultaneously said tapes extending to said base, around said rollers within the base; a tracing tool on the free end of one of said secondary arms; and a reproducing tool on the free end of the other of said secondary arms, substantially as described.

9. In a pantograph, the combination of a base, rollers within the base movable horizontally, two horizontal arms pivoted upon and swinging from said base; connections between said primary arms whereby the latter will be moved simultaneously; a secondary arm pivoted upon and swinging from the free end of each of said primary arms; a drum on the pivoted end of each secondary drum; tapes extending from the periphery of one of said drums to the periphery of the other of said drums, and extending around said horizontally movable rollers in the base, a tracing tool in the free end of one secondary arm, and a reproducing tool in the free end of the other secondary arm, substantially as described.

10. In a pantograph, the combination of a base; rollers within said base movable horizontally; two primary arms movable upon and swinging from said base; connections between said primary arms, whereby the latter may be operated simultaneously; connections between one of said primary arms and said rollers, whereby the latter will be moved horizontally as the primary arms are moved pivotally; a secondary arm pivoted upon and moving from the free end of each of said primary arms; a drum on the pivoted end of each secondary arm; tapes extending from the periphery of one of said drums to the periphery of the other of said drums, around said horizontally movable rollers within the base, whereby the secondary arms may be operated simultaneously; a tracing tool on the free end of one of said secondary arms; and a reproducing tool on the free end of the other of said secondary arms, substantially as described.

11. In a pantograph the combination of a base; a horizontally movable carrying plate "39" on said base; rollers "27" "27" "29" "29" "38" mounted upon said carrying plate; a face wheel "47" connected with and operating said carrying plate; two primary arms pivoted upon and swinging from said base; connections between the said primary arms, whereby the latter may be operated simultaneously; connections between one of said primary arms and said face wheel "47" whereby the latter will be partially rotated as the primary arms are moved pivotally; a secondary arm pivoted upon and swinging from the free end of each of said primary arms; a drum on the pivoted end of each secondary arm; tapes extending from the periphery of one of said drums to the periphery of the other of said drums, around said rollers "27" "27" "29" "29" within the base whereby the secondary arms will be operated simultaneously; a tracing tool on the free end of one of said secondary arms; and a reproducing tool on the free end of the other of said secondary arms, substantially as described.

12. In a pantograph, the combination of a base, a horizontally movable carrying plate "39" on said base; rollers "27" "27" "29" "29" "38" mounted on said carrying plate; a face wheel "47" mounted on the base, adjacent to said carrying-plate "39;" a cam groove "48" in said face wheel; a screw "49" in said carrying plate "39" engaging with said cam groove; two primary arms pivoted upon and swinging from said base; connections between said primary arms, whereby the latter may be operated simultaneously; a spur wheel "44" on the shaft of one of said primary arms; a spur wheel "45" mounted on the shaft "46" of the said face wheel "47" and engaging with said spur wheel "44" whereby the said carrying plate "39" will be moved horizontally as said primary arms are moved pivotally; a secondary arm, pivoted to the free end of each primary arm; a drum on the pivoted end of each secondary arm; tapes extending from the periphery of one drum to the periphery of the other drum, around said rollers "27" "27" "29" "29" "38" whereby the secondary arms will be operated simultaneously; a guide arm "40" carrying fingers "41" on said carrying plate "39" for retaining said tapes in place on said rollers; a tracing tool on the free end of one of said secondary arms; and a reproducing tool on the free end of the other of said secondary arms, substantially as described.

13. In a pantograph, the combination of a base; primary arms pivoted to said base; a drum on the pivoted end of each primary arm; tapes extending from the periphery of one drum to the interior of the other drum; an adjusting bobbin "50" in each drum for said tapes; secondary arms pivoted to the free end of each primary arm; and connections between said secondary arms, whereby the latter may be operated simultaneously, substantially as set forth.

In testimony whereof we affix our signatures in presence of two witnesses.

DAVID W. RUSSELL.
GEORGE SHILLING.

Witnesses:
J. B. McGIRR,
A. G. REESE.